(12) United States Patent
Nakanishi et al.

(10) Patent No.: US 9,128,236 B2
(45) Date of Patent: Sep. 8, 2015

(54) OPTICAL FIBER

(71) Applicant: SUMITOMO ELECTRIC INDUSTRIES, LTD., Osaka-shi, Osaka (JP)

(72) Inventors: Tetsuya Nakanishi, Yokohama (JP); Tatsuya Konishi, Yokohama (JP); Kazuya Kuwahara, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/628,077

(22) Filed: Feb. 20, 2015

(65) Prior Publication Data

US 2015/0160410 A1    Jun. 11, 2015

Related U.S. Application Data

(63) Continuation of application No. 14/111,028, filed as application No. PCT/JP2012/077549 on Oct. 25, 2012, now Pat. No. 8,989,545.

(30) Foreign Application Priority Data

Nov. 14, 2011    (JP) ................. 2011-248479

(51) Int. Cl.
 *G02B 6/02*    (2006.01)
 *G02B 6/036*    (2006.01)
(52) U.S. Cl.
 CPC ..................... *G02B 6/036* (2013.01)
(58) Field of Classification Search
 CPC ............ C03B 2201/31; C03B 2201/78; C03B 37/018; G02B 6/02395; G02B 6/03694; G02B 6/022
 USPC .................... 385/123, 128; 398/141
 See application file for complete search history.

(56) References Cited

U.S. PATENT DOCUMENTS

| 4,447,127 A | 5/1984 | Cohen et al. |
| 8,687,936 B2 | 4/2014 | Nakanishi et al. |

(Continued)

FOREIGN PATENT DOCUMENTS

| JP | H03-196102 A | 8/1991 |
| JP | H11-180725 A | 7/1999 |

(Continued)

OTHER PUBLICATIONS

D.-L. Kim et al., "Fictive temperature of silica glass optical fibers—re-examination," Journal of Non-Crystalline Solids, 2001, pp. 132-138, vol. 286.
T. Kato et al., "Ultra-low nonlinearity low-loss pure silica core fibre for long-haul WDM transmission," Electronic Letters, Sep. 16, 1999, vol. 35, No. 19.
Masaharu Ohashi et al., "Imperfection Loss Reduction in Viscosity-Matched Optical Fibers," IEEE Photonics Technology Letters, Jul. 1993, pp. 812-814, vol. 5, No. 7.

(Continued)

*Primary Examiner* — Ellen Kim
(74) *Attorney, Agent, or Firm* — Drinker Biddle & Reath LLP

(57) ABSTRACT

An inexpensive low-attenuation optical fiber 1 suitable for use as an optical transmission line in an optical access network is a silica based glass optical fiber and includes a core 11 including the center axis, an optical cladding 12 surrounding the core, and a jacket 13 surrounding the optical cladding. The core contains $GeO_2$ and has a relative refractive index difference $\Delta core$, based on the optical cladding, greater than or equal to 0.35% and less than or equal to 0.50% and has a refractive index volume v greater than or equal to 0.045 $\mu m^2$ and less than or equal to 0.095 $\mu m^2$. The jacket has a relative refractive index difference $\Delta J$ greater than or equal to 0.03% and less than or equal to 0.20%. Glass constituting the core has a fictive temperature higher than or equal to 1400° C. and lower than or equal to 1590° C. Residual stress in the core is compressive stress that has an absolute value greater than or equal to 5 MPa.

19 Claims, 6 Drawing Sheets

(56) References Cited

U.S. PATENT DOCUMENTS

| | | | |
|---|---|---|---|
| 8,849,082 B2* | 9/2014 | Bookbinder et al. | 385/124 |
| 2009/0180103 A1 | 7/2009 | Kim et al. | |
| 2009/0263091 A1 | 10/2009 | Kumano | |
| 2011/0064368 A1 | 3/2011 | Bookbinder et al. | |

FOREIGN PATENT DOCUMENTS

| | | |
|---|---|---|
| JP | 2005-343703 A | 12/2005 |
| JP | 2006-058494 A | 3/2006 |
| JP | 2009/168813 A | 7/2009 |
| WO | WO-2009/066429 A1 | 5/2009 |

OTHER PUBLICATIONS

Giuseppe Talli, et al., "Hybrid DWDM-TDM Long-Reach PON for Next-Generation Optical Access," Journal of Lightwave Technology, Jul. 2006, pp. 2827-2834, vol. 24, No. 7.

Shigeki Sakaguchi et al., "Rayleigh scattering of silica core optical fiber after heat treatment," Applied Optics, Nov. 20, 1998, pp. 7708-7711, vol. 37, No. 33.

K. Saito et al., "Control of Glass-Forming Process During Fiber-Drawing to Reduce the Rayleigh Scattering Loss," Journal of the American Ceramic Society, Jan. 2006, pp. 65-69, vol. 89, No. 1.

* cited by examiner

OPTICAL FIBER

This is a continuation application of copending prior application Ser. No. 14/111,028, filed on Oct. 10, 2013, which is a National Stage of International Application No. PCT/JP2012/077549 filed Oct. 25, 2012, each of which are incorporated herein in their entirety.

TECHNICAL FIELD

The present invention relates to an optical fiber and an optical transmission system.

BACKGROUND ART

An optical access network, called "long-reach passive optical network (PON)", is described as a next-generation optical transmission system in G. Talli et al., J. Lightw. Technol., Vol. 24, No. 7, 2827-2834 (2006). The long-reach PON is a transmission system for transmission of signal light from an optical line terminal (OLT) at a telephone central office through a splitter to an optical network unit (ONU) at a subscriber's home, and enables an optical transmission line between the OLT and the ONU to have a long length and can therefore reduce communication cost.

Such an optical transmission system preferably uses a low-attenuation optical fiber in order to extend a communication distance while maintaining an optical signal-to-noise ratio (OSNR). As regards a low-attenuation optical fiber, an optical fiber including a pure-silica-core is disclosed in T. Kato et al., Electron. Lett., Vol. 35, No. 19, 1615-1617 (1999). Unfortunately, the introduction of pure-silica-core optical fibers to optical access networks has not progressed for economic reasons that a typical pure-silica-core optical fiber is expensive.

S. Sakaguchi et al., Appl. Opt., Vol. 37, No. 33, 7708-7711 (1998) and JP2006-58494A disclose technology for reducing attenuation in a general-purpose optical fiber compliant with ITU-T G. 652. According to this technology, when an optical fiber preform is drawn to form an optical fiber, the optical fiber is slowly cooled to reduce the fictive temperature of glass constituting the fiber in order to reduce Rayleigh scattering in the optical fiber, thus achieving low attenuation.

SUMMARY OF INVENTION

Technical Problem

The present invention provides an inexpensive low-attenuation optical fiber suitable for use as an optical transmission line in an optical access network and an optical transmission system in which the optical fiber is placed as a transmission line.

Solution to Problem

The present invention provides a silica based glass optical fiber that includes a core including the center axis of the optical fiber, an optical cladding surrounding the core, and a jacket surrounding the optical cladding. The core contains $GeO_2$, and a refractive index volume $$v = 2\int_0^a \Delta(r) \cdot r \, dr \quad (1)$$

of the core is greater than or equal to 0.045 μm² and less than or equal to 0.095 μm², where $\Delta(r)$ denotes the relative refractive index difference at a radial coordinate r and a denotes the radius of the core. Glass constituting the core has a fictive temperature higher than or equal to 1300° C. and lower than or equal to 1590° C., preferably lower than or equal to 1560° C., and more preferably lower than or equal to 1530° C. Residual stress in the core is compressive stress that has an absolute value less than or equal to 30 MPa or tensile stress that has an absolute value less than or equal to 10 Mpa. In the optical fiber according to the present invention, a relative refractive index difference Δcore of the core may be greater than or equal to 0.35% and less than or equal to 0.50% and the jacket may have a relative refractive index difference AJ greater than or equal to 0.03% and less than or equal to 0.20%.

In this specification, the term "relative refractive index difference" means a value $((n - n_{cladding})/n_{cladding})$ based on the refractive index, n, of each component (core or jacket) relative to the refractive index, $n_{cladding}$, of the optical cladding. The term "refractive index of the core" means an equivalent step index (ESI). The term "outside diameter of the optical cladding" means a diameter at which a derivative of refractive index with respect to the radial coordinate at the interface between the optical cladding and the jacket reaches its maximum. The term "refractive index of the jacket" means the mean value of refractive indices of the optical cladding from part having the outside diameter of the optical cladding to outermost part of the glass.

In the optical fiber according to the present invention, a 2-m fiber cutoff wavelength may be greater than or equal to 1260 nm, a 22-m cable cutoff wavelength may be less than or equal to 1260 nm, a mode field diameter at a wavelength of 1310 nm may be greater than or equal to 8.2 μm and less than or equal to 9 μm, and an attenuation at a wavelength of 1550 nm may be less than or equal to 0.18 dB/km. Residual stress in part of 50% or more of the cross-sectional area of the jacket in a cross-section perpendicular to the axis of the fiber may be tensile stress. An increment in attenuation due to OH groups at a wavelength of 1383 nm may be less than or equal to 0.02 dB/km. The core may contain fluorine. The optical fiber may further include a primary coating and a secondary coating which surround the jacket. The secondary coating may have a Young's modulus greater than or equal to 800 MPa and the primary coating may have a Young's modulus less than or equal to 1 MPa or may have a Young's modulus greater than or equal to 0.2 MPa.

In the optical fiber according to the present invention, at a wavelength of 1550 nm, a bending loss at a bend radius of 15 mm may be less than or equal to 0.002 dB/turn, a bending loss at a bend radius of 10 mm may be less than or equal to 0.2 dB/turn, a bending loss at a bend radius of 10 mm may be less than or equal to 0.1 dB/turn, and a bending loss at a bend radius of 7.5 mm may be less than or equal to 0.5 dB/turn. Furthermore, in the optical fiber according to the present invention, at a wavelength of 1625 nm, a bending loss at a bend radius of 15 mm may be less than or equal to 0.01 dB/turn, a bending loss at a bend radius of 10 mm may be less than or equal to 0.4 dB/turn, a bending loss at a bend radius of 10 mm may be less than or equal to 0.2 dB/turn, and a bending loss at a bend radius of 7.5 mm may be less than or equal to 1 dB/turn.

In the optical fiber according to the present invention, a MAC value (=MFD/λc) that is the ratio of the mode field diameter, MFD, at a wavelength of 1310 nm to the 2-m fiber cutoff wavelength, λc, may be less than or equal to 6.6. An attenuation difference ($\alpha\_\beta - \alpha\_t$) between an attenuation $\alpha\_\beta$ at a wavelength of 1550 nm measured on the fiber having a length of 10 km or longer wound on a 140-φ bobbin and an attenuation $\alpha\_t$ at a wavelength of 1550 nm measured on the fiber in a loosely constrained loop may be less than 0.01 dB/km. In the optical fiber according to the present invention, the optical fiber with coating may have an outside diameter less than or equal to 210 μm. This enables a reduction in cross-sectional area, thus increasing the efficiency of space utilization after placement. In this case, from the viewpoint of preventing break, the secondary coating may have a thickness greater than or equal to 10 μm.

The present invention provides an optical transmission system for transmission of signal light from an optical line terminal at a telephone central office through a splitter to an optical network unit at a subscriber's home, wherein an optical transmission line between the optical line terminal at the telephone central office and the splitter or between the splitter and the optical network unit at the subscriber's home has a length greater than or equal to 15 km, and wherein the optical fiber according to the present invention is placed in a section of 90% or more of the optical transmission line. The present invention further provides an optical transmission system for transmission of signal light from a transmitter to a receiver, wherein an optical transmission line between the transmitter and the receiver has a length greater than or equal to 40 km, and wherein the optical fiber according to the present invention is placed in a section of 90% or more of the optical transmission line.

The present invention further provides an optical transmission system for transmission of signal light from an optical line terminal at a telephone central office through a splitter to an optical network unit at a subscriber's home, wherein the optical fiber according to the present invention is placed in a section of 50% or more of an optical transmission line between the optical line terminal at the telephone central office and the optical network unit at the subscriber's home, and wherein the signal light is not amplified in the optical transmission line. The present invention further provides an optical transmission system for transmission of signal light from an optical line terminal at a telephone central office through a splitter to an optical network unit at a subscriber's home, wherein the optical fiber according to the present invention is placed in a section of 50% or more of an optical transmission line between the optical line terminal at the telephone central office and the optical network unit at the subscriber's home, and wherein the signal light is amplified in the optical transmission line.

Advantageous Effects of Invention

According to the present invention, an inexpensive low-attenuation optical fiber suitable for use as an optical transmission line in an optical access network is provided.

DESCRIPTION OF EMBODIMENTS

Figure 1:
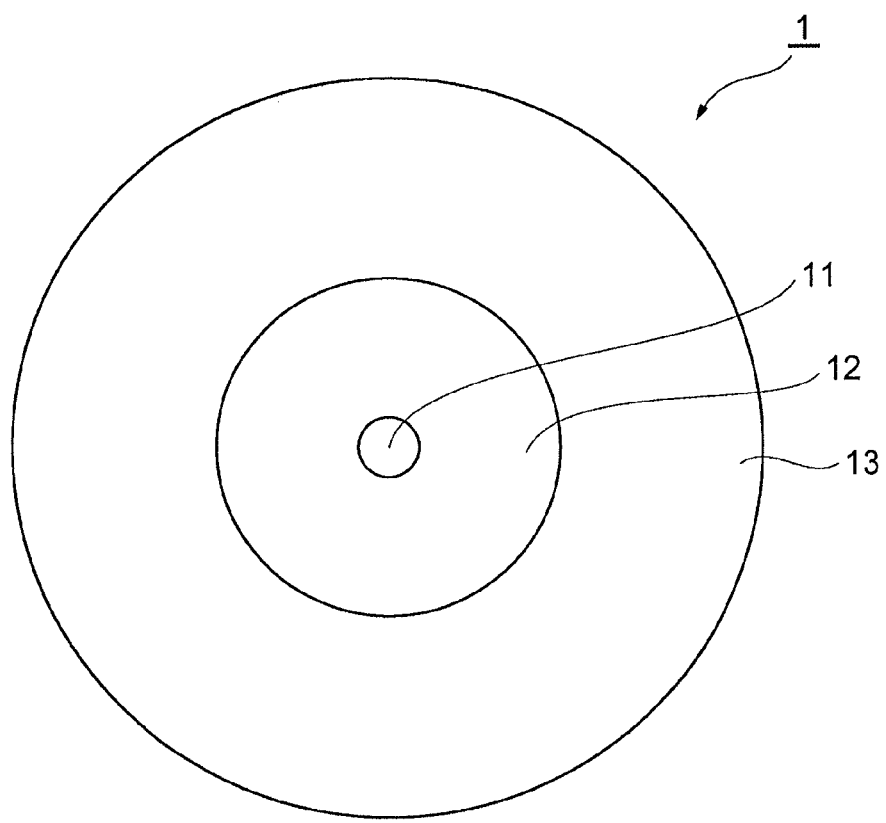
FIG. 1 is a cross-sectional view of an optical fiber according to an embodiment of the present invention.

Embodiments of the present invention will be described in detail below with reference to the drawings, which are intended for purposes of illustration and are not intended to limit the scope of the invention. In the drawings, the same components are designated by the identical reference numerals to avoid redundant explanation. The dimensions or proportions in the drawings are not necessarily exact.

The inventors have found that in the case where the core contains $GeO_2$, if the fictive temperature of glass is reduced by slow cooling to reduce Rayleigh scattering, loss components (hereinafter, referred to as "excess loss") caused by factors other than Rayleigh scattering may increase and a low-attenuation optical fiber may not always be achieved. As far as the inventors know, the relationship between excess loss in an optical fiber including a $GeO_2$-doped core and residual stress in the core is not mentioned in S. Sakaguchi et al. and JP2006-58494A, which disclose reduction of attenuation in an optical fiber by slow cooling of glass, and M. Ohashi et al., IEEE Photon. Technol. Lett., Vol. 5, No. 7, 812-814 (1993) which discloses reduction of attenuation in an optical fiber by core-cladding viscosity matching.

FIG. 1 is a cross-sectional view of an optical fiber 1 according to an embodiment of the present invention. The optical fiber 1 is an optical fiber that is composed of $SiO_2$ glass and includes a core 11 including the center axis, an optical cladding 12 surrounding the core 11, and a jacket 13 surrounding the optical cladding 12. The core 11 contains $GeO_2$ and may further contain fluorine. The optical cladding 12 has a lower refractive index than the core 11. The optical cladding 12 may be composed of pure $SiO_2$ glass or $SiO_2$ glass doped with fluorine. The jacket 13 is composed of pure $SiO_2$ glass and may contain chlorine.

Reducing Rayleigh scattering in the optical fiber 1 can reduce attenuation in the optical fiber 1. Reducing the fictive temperature of glass constituting the optical fiber 1 is effective in reducing Rayleigh scattering. Methods of reducing the fictive temperature of glass include a first method and a second method as follows.

The first method is a method (slow cooling method) of, during drawing of an optical fiber preform to form the optical fiber 1, slowing the rate of cooling of the formed optical fiber to accelerate the network structural relaxation of glass, thus reducing the fictive temperature of glass. The second method is a method of adding a very small amount of additive, which does not add attenuation caused by light absorption while accelerating the structural relaxation of the core 11, to the core 11, thus reducing the fictive temperature of glass.

The optical fiber 1 may be subjected to reduction of Rayleigh scattering by either of the first and second methods or may be subjected to reduction of Rayleigh scattering by appropriate combination of the methods. The slow cooling method will be described below.

A method of making the optical fiber 1 is as follows. First, a core through which light travels is formed by vapor phase glass synthesis, such as vapor axial deposition (VAD), outside vapor deposition (OVD), modified chemical vapor deposition (MCVD), or plasma chemical vapor deposition (PCVD), and the core is surrounded with a jacket layer formed by VAD, OVD, advanced plasma vapor deposition (APVD), rod-in-collapse, or another similar method, thus forming an optical fiber preform. An intermediate optical cladding layer may be formed by VAD, OVD, MCVD, rod-in-collapse, or another similar method between the core and the jacket. The optical fiber preform formed in this manner is grasped by a drawing tower, a lower end of the preform is heated at or above a working temperature, and a drop-shaped tip of melted glass is appropriately drawn to form a fiber, thus making a glass fiber. The rate of drawing is controlled such that the glass fiber has a predetermined outside diameter. The glass fiber is coated with resin, thus forming a coated optical fiber. The coated optical fiber is wound on a take-up bobbin.

A coating layer of resin has a double-layer structure and includes a primary coating that protects the glass fiber against direct application of external force and a secondary coating that protects the glass fiber against external damage. Dies for applying the resin coatings may be arranged in series at a stage of fiber formation. Alternatively, the resin coatings may be applied by a die for simultaneously ejecting two coatings. In this case, the drawing tower can be reduced in height. Accordingly, the cost of constructing a building for housing the drawing tower can be reduced.

Furthermore, a device for controlling the rate of cooling the formed glass fiber may be placed between a drawing furnace and the die, so that a surface temperature of the glass fiber entering the die can be controlled to a proper temperature. Preferably, a gas flowing through the device for controlling the cooling rate has a lower Reynolds number because vibrations due to the occurrence of turbulent flow on the formed fiber are reduced. Furthermore, controlling the cooling rate of the glass fiber can reduce Rayleigh scattering, thus achieving an optical fiber with low attenuation.

In a UV furnace for curing the resin, the rate of curing of the resin can be appropriately controlled by feedback-controlling the intensity of UV light and a temperature in the furnace. A magnetron or an ultraviolet LED is suitably used in the UV furnace. In the use of the ultraviolet LED, since such a light source does not generate heat, a mechanism for supplying hot air is additionally disposed so that the furnace is controlled to a proper temperature. A component leaving from the resin may adhere to an inner surface of a furnace tube of the UV furnace, leading to a change in power of UV light that reaches the coating layer during drawing. Accordingly, the degree of reduction in UV light power during drawing may be monitored in advance and the power of UV light may be controlled depending on drawing time such that UV light applied to the coating layer is controlled at constant power. Alternatively, the UV light leaked from the furnace tube may be monitored and the power of UV light may be controlled such that UV light applied to the coating layer is controlled at constant power. This enables the optical fiber to have a uniform breaking strength throughout the entire length thereof.

Preferably, the thickness of the secondary coating of the two coatings is appropriately set so as to keep the resistance to external damage. Typically, the thickness of the secondary coating is preferably greater than or equal to 10 μm, and more preferably greater than or equal to 20 μm. The optical fiber 1 made in this manner and wound on the take-up bobbin is colored as necessary and is used as an end product, such as an optical cable or an optical cord.

According to the embodiment of the present invention, the optical fiber, formed in the drawing furnace, leaving the drawing furnace passes through a slow-cooling unit and a heating furnace and then enters the die. The slow-cooling unit cools a region from tapered part, whose diameter ranges from 90% to 5% of the diameter of the preform, in the lower end of the melted optical fiber preform to part, in which the formed optical fiber is at a temperature of 1400° C., at a cooling rate greater than or equal to 1000° C./s and less than or equal to 20000° C./s in a continuous manner. The heating furnace is disposed below a plane (outlet of the drawing furnace) which is lower part of the drawing furnace and from which the formed optical fiber substantially emerges out of the drawing furnace. The distance between the outlet of the drawing furnace and an inlet of the heating furnace is 1 m or less. Preferably, the slow-cooling unit disposed between the outlet of the drawing furnace and the inlet of the heating furnace has a thermal insulating structure for preventing a decrease in temperature of the formed optical fiber. When entering the heating furnace, the optical fiber is at a temperature preferably higher than or equal to 1000° C., and more preferably higher than or equal to 1400° C.

This enables a reduction in length of the heating furnace in which the optical fiber is reheated to a temperature (typically, a temperature at or above the glass transition point) which substantially allows structural relaxation. Thus, the time required for structural relaxation can be increased. Let V be the drawing rate, the length, L, of the heating furnace is set such that L/V is greater than or equal to 0.05 s. Preferably, the heating furnace includes a plurality of furnaces. Thus, the cooling rate of the optical fiber can be controlled more accurately. Preferably, the cooling rate is greater than or equal to 5000° C./s until the optical fiber in the heating furnace is cooled to 1100° C. or lower. The use of the above-described heating furnace for optical fiber production can achieve an optical fiber with reduced Rayleigh scattering.

Figure 2:
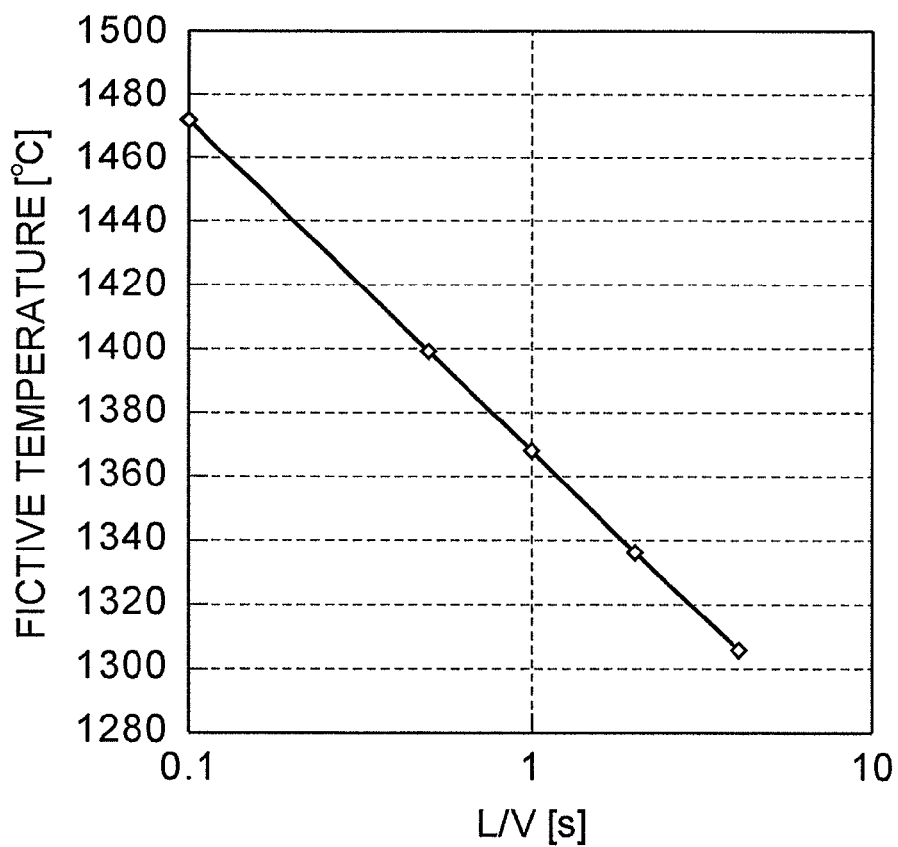
FIG. 2 is a graph illustrating the dependence of the reachable fictive temperature of an optical fiber including a $GeO_2$-containing core on L/V.

Increasing L/V can reduce the fictive temperature of glass. Considering economics, the drawing rate V is preferably greater than or equal to 20 m/s. For example, to achieve L/V=0.2 s, the length L of the heating furnace has to be 4 m. As described above, the compatibility between the construction cost for the equipment or building affected by the length of the heating furnace and the drawing rate has a certain limit. FIG. 2 is a graph illustrating the dependence of the reachable fictive temperature of an optical fiber including a $GeO_2$-containing core on L/V. FIG. 2 is formed on the basis of data of Table 1 in K. Saito et al., J. Am. Ceram. Soc., Vol. 89 [1], 65-69 (2006). In the case where L/V<0.5 s is permitted in consideration of economic requirements, the reachable fictive temperature is 1400° C.

Figure 3:
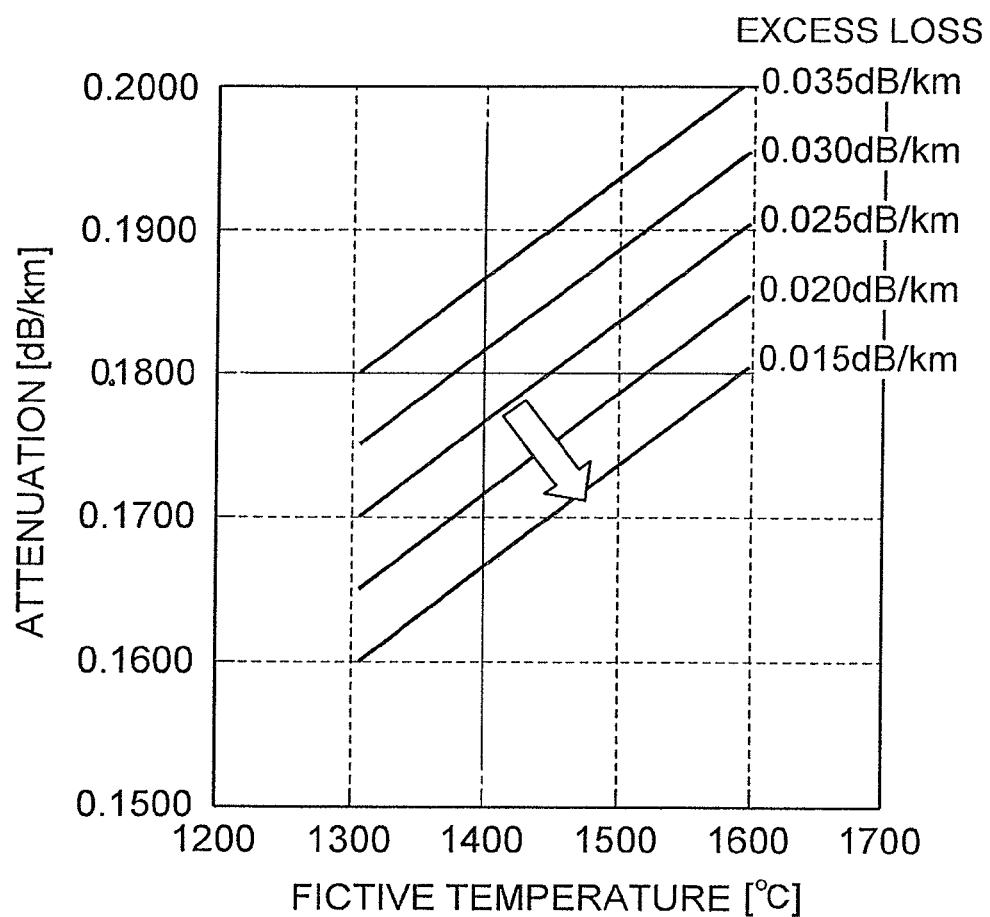
FIG. 3 is a graph illustrating the dependence of attenuation in an optical fiber on the fictive temperature.

FIG. 3 is a graph illustrating the dependence of attenuation of an optical fiber on the fictive temperature and being formed on the basis of Eq. (2) of K. Saito et al. The term "excess loss" in FIG. 3 means attenuation (including macrobending loss and microbending loss) other than loss caused by Rayleigh scattering, Brillouin scattering, and Raman scattering. When the excess loss is greater than or equal to 0.030 dB/km, it is difficult to achieve an attenuation of 0.18 dB/km at a wavelength of 1550 nm on condition that the fictive temperature is 1400° C. In addition, when the excess loss is greater than or equal to 0.035 dB/km, it is difficult to achieve an attenuation of 0.18 dB/km at a wavelength of 1550 nm on condition that the fictive temperature is 1300° C.

Figure 4:
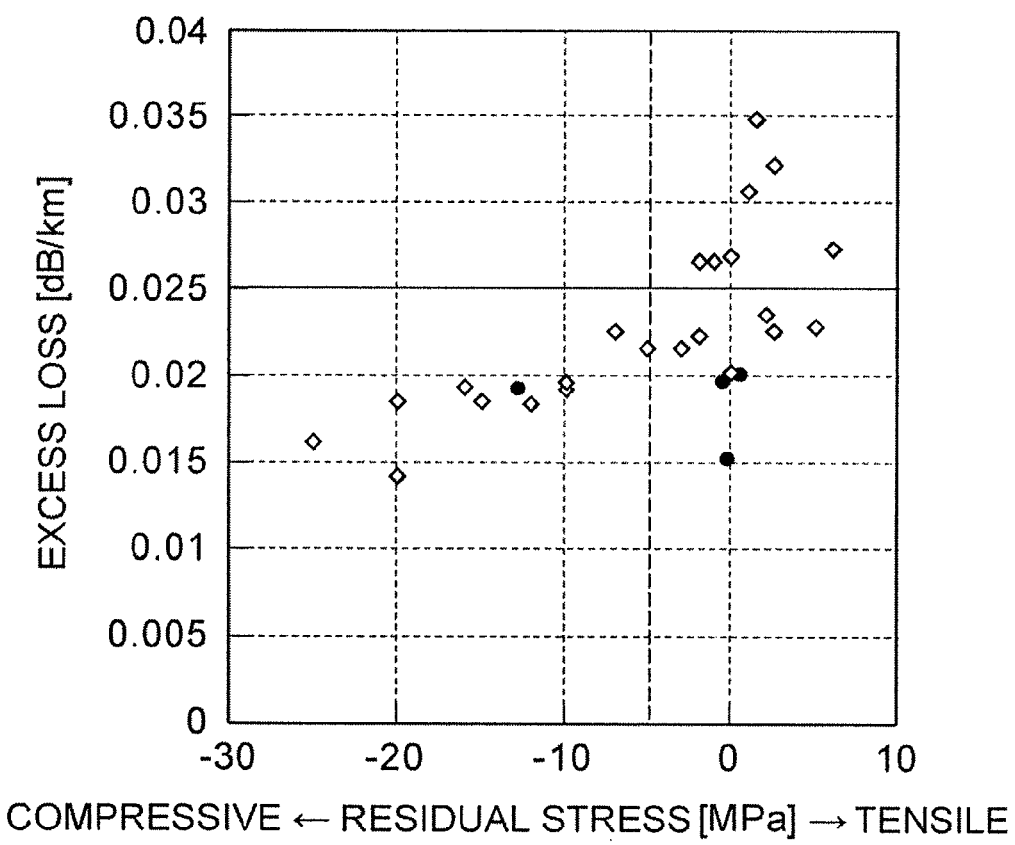
FIG. 4 is a graph illustrating the dependence of excess loss on residual stress in the core.

As described above, in the case where the fictive temperature of glass is reduced by slow cooling such that Rayleigh scattering is reduced but the excess loss caused by factors other than a Rayleigh scattering component increases, it is difficult to allow an attenuation at a wavelength of 1550 nm to be stable less than or equal to 0.18 dB/km. The inventors have determined factors causing the increase of excess loss and thus found good correlation between excess loss and residual stress in the core. FIG. 4 is a graph illustrating the dependence of excess loss on residual stress in the core. The graph demonstrates that when residual stress in the core is tensile stress that has an absolute value less than or equal to 10 MPa, excess loss can be less than or equal to 0.35 dB/km. Also, when residual stress in the core is compressive stress that has an absolute value greater than or equal to 5 MPa (at or below −5 MPa in FIG. 4), excess loss can be less than or equal to 0.02 dB/km, and more reliably less than or equal to 0.025 dB/km.

When residual stress in the core is compressive stress having an absolute value greater than or equal to 5 MPa, excess loss is substantially less than or equal to 0.02 dB/km. Consequently, attenuations of 0.180 dB/km, 0.183 dB/km, and 0.185 dB/km at a wavelength of 1550 nm can be achieved at fictive temperatures of 1530° C., 1560° C., and 1590° C., respectively.

The core 11 of the optical fiber 1 contains $GeO_2$ and has a relative refractive index difference, Δcore, greater than or equal to 0.35% and less than or equal to 0.50% and has a refractive index volume v greater than or equal to 0.045 μm$^2$ and less than or equal to 0.095 μm$^2$, the refractive index volume v being expressed by Eq. (2):

$$v=2\int_0^a \Delta(r) \cdot r \cdot dr \quad (2)$$

where Δ(r) denotes the relative refractive index difference at a radial coordinate r and a denotes the radius of the core. More preferably, the refractive index volume v is greater than or equal to 0.06 μm$^2$ and less than or equal to 0.085 μm$^2$. The jacket 13 has a relative refractive index difference ΔJ greater than or equal to 0.03% and less than or equal to 0.20%. Glass constituting the core 11 has a fictive temperature higher than or equal to 1400° C. and lower than or equal to 1590° C., preferably lower than or equal to 1560° C., and more preferably lower than or equal to 1530° C. Furthermore, residual stress in the core 11 is compressive stress that has an absolute value greater than or equal to 5 MPa.

In the optical fiber 1, preferably, a 2-m fiber cutoff wavelength is greater than or equal to 1260 nm, a 22-m cable cutoff wavelength is less than or equal to 1260 nm, a mode field diameter at a wavelength of 1310 nm is greater than or equal to 8.2 μm and less than or equal to 9 μM, and an attenuation at a wavelength of 1550 nm is less than or equal to 0.18 dB/km. More preferably, an attenuation at a wavelength of 1550 nm is less than or equal to 0.178 dB/km and the 2-m fiber cutoff wavelength is greater than or equal to 1290 nm.

Figure 5:
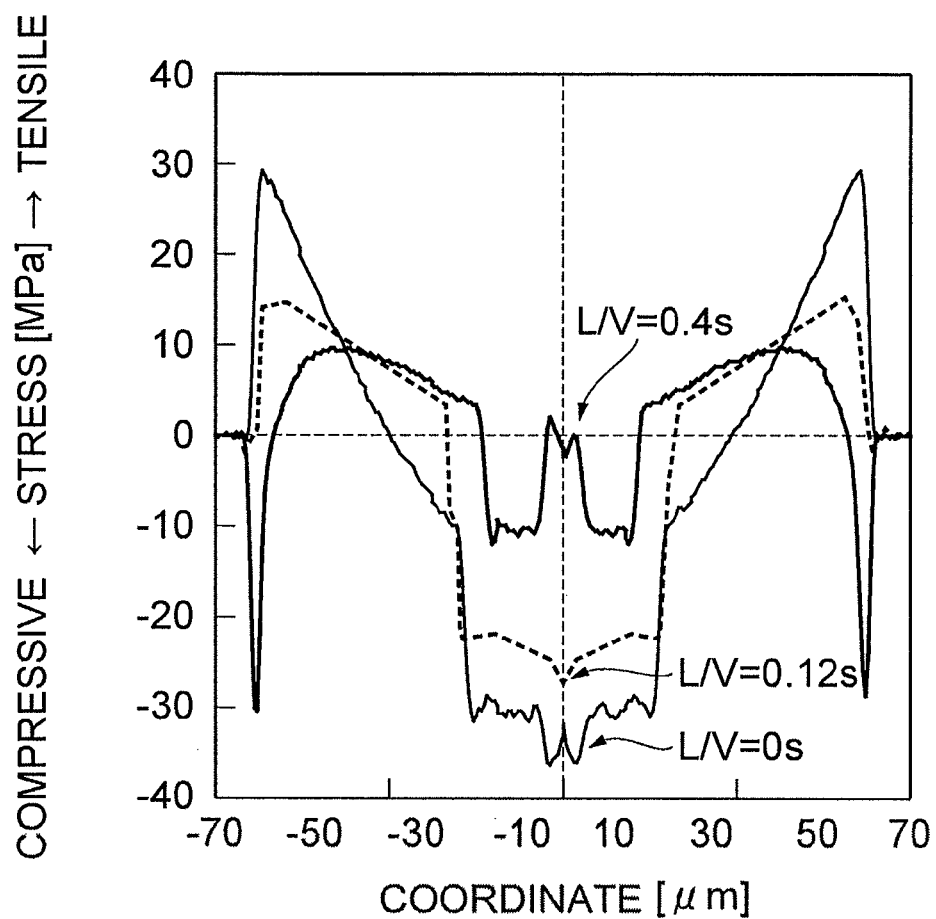
FIG. 5 is a graph illustrating the radial distributions of residual stress in an optical fiber.

As described in JP2009-168813A, residual stress in the optical fiber is measured using birefringence in the optical fiber. Alternatively, residual stress in the optical fiber can be measured on the basis of an amount of change in refractive index, obtained by area analysis on the refractive index in cross-section of the optical fiber, and a photoelastic coefficient inherent in a material. FIG. 5 is a graph illustrating the radial distributions of residual stress in an optical fiber. In the optical fiber including a $GeO_2$-containing core and a jacket that is substantially composed of pure silica, since the viscosity of the core is lower than that of the jacket at the same temperature, compressive stress remains in the core of the drawn optical fiber (L/V=0 s in FIG. 5). Such compressive stress changes depending on drawing tension. It is known that, in principle, the larger the drawing tension, the larger the compressive stress remains.

Furthermore, in the optical fiber subjected to slow cooling, compressive stress is relaxed in the slow-cooling unit, so that the absolute value of compressive stress is lowered. FIG. 5 illustrates variations of residual stresses obtained by changing L/V to 0 s, 0.12 s, and 0.40 s. It is known that increasing residence time of the optical fiber in the slow-cooling unit gradually reduces the absolute value of compressive stress in the core. To allow the absolute value of compressive stress in the core to be greater than or equal to 5 MPa, preferably, L/V is less than 0.4 s. Additionally, keeping the optical fiber at a temperature higher than an inner surface temperature of the slow-cooling unit until the optical fiber reaches the slow-cooling unit during cooling of the optical fiber can prevent compressive stress in the core from being excessively reduced. In principle, the longer the slow-cooling unit, the larger the effect of slow cooling. Thus, the amount of change in compressive stress is increased.

For example, in the case where the slow-cooling unit has a length greater than or equal to 2 m, it is important to maintain L/V at or below 0.2 s. Furthermore, tension applied to the optical fiber glass which is being drawn is preferably greater than or equal to 50 g, and more preferably greater than or equal to 100 g.

As regards another method of controlling stress in the core, an additive to reduce the viscosity of the core may be added to the core, so that the absolute value of compressive stress in the core can be controlled at or above 5 MPa. An alkali metal element is preferably used as an additive because a very small amount of alkali metal element can markedly reduce the viscosity of silica glass. Excessive addition of an alkali metal element unfortunately causes an increase of glass structural defects, so that hydrogen characteristics and radiation characteristics are degraded. It is therefore preferable to adjust an amount to be a suitable value. Preferably, the concentration of alkali metal element in the core after drawing is greater than or equal to 1 wtppb and less than or equal to 10 wtppm.

Figure 6:
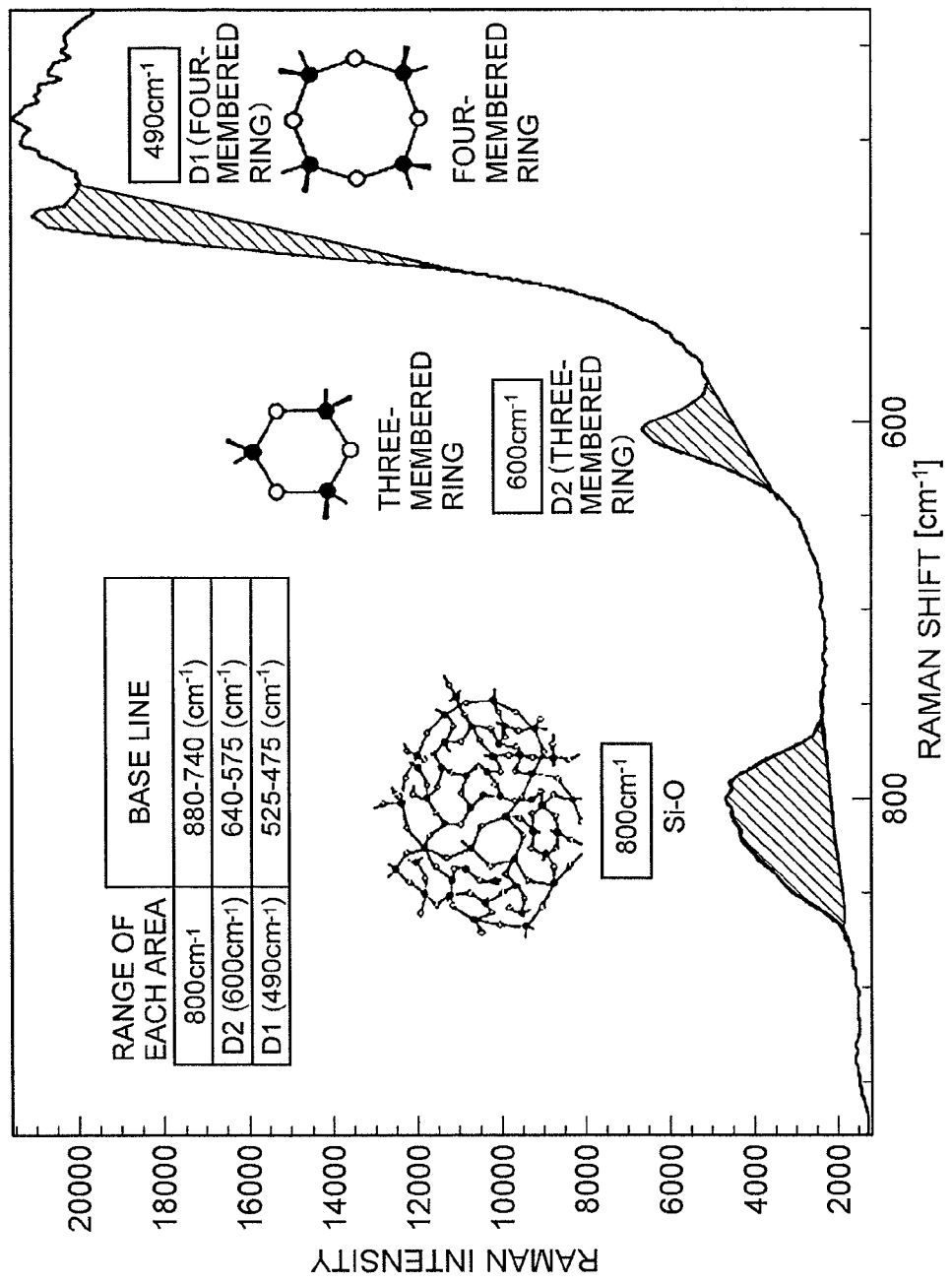
FIG. 6 is a graph illustrating the relationship between Raman intensity and Raman shift.

FIG. 6 is a graph illustrating the relationship between Raman intensity and Raman shift. The fictive temperature of an optical fiber can be evaluated on the basis of a relationship between a ratio of a D1 (490 cm$^{-1}$) peak area to an 800 cm$^{-1}$ peak area in microscopic Raman scattering spectra in components constituting the optical fiber. A base line is drawn in a wave number range between 525 cm$^{-1}$ and 475 cm$^{-1}$ and the peak area of D1 between the base line and a spectrum is calculated. Furthermore, a base line is drawn in a wave number range between 880 cm$^{-1}$ and 740 cm$^{-1}$ and the 800 cm$^{-1}$ peak area between the base line and a spectrum is calculated. The fictive temperature can be obtained using the relationship between the ratio of the 800 cm$^{-1}$ peak area to the D1 peak area and the fictive temperature measured using, for example, bulk glass by the IR method (D.-L. Kim and M. Tomozawa, J. Non-Cryst. Solids, Vol. 286, 132-138 (2001)).

The optical fiber according to the present embodiment preferably conforms to ITU-T G. 657. A1 and preferably further has bending loss compliant with G. 657. A2. Since the optical fiber according to the present embodiment conforms to G. 657. A2, this optical fiber can be connected to a general-purpose single-mode fiber compliant with G. 652. D with low attenuation and can be used the same as the G 652. D fiber in a transmission system.

In the optical fiber according to the present embodiment, preferably, residual stress in part of 50% or more of the cross-sectional area of the jacket in a cross-section perpendicular to the axis of the fiber is tensile stress. To allow residual stress in the core to be compressive stress, tensile strain has to be applied to the jacket such that the magnitude of tensile strain is equal to that of compressive stress applied to the core. Controlling the tension, thermal history, and composition of the optical fiber so that residual stress in 50% or more of the cross-sectional area of the jacket is tensile stress easily enables residual stress in the core to be compressive stress.

In the optical fiber according to the present embodiment, preferably, the absolute value of residual stress in the core is less than or equal to 30 MPa. More preferably, the absolute value of residual stress in the core is less than or equal to 10 MPa. Stress in the core is allowed to be compressive strain and its absolute value is allowed to be less than or equal to 30 MPa, so that excess loss can be less than or equal to 0.02 dB/km while the effect of reducing Rayleigh scattering by slow-cooling drawing is fully achieved.

In the optical fiber according to the present embodiment, preferably, an increment in attenuation due to OH groups at a wavelength of 1383 nm is less than or equal to 0.02 dB/km. The presence of OH absorption causes an increase in attenuation at a wavelength of 1550 nm. In the case where an increment in attenuation due to OH groups at a wavelength of 1383 nm is less than or equal to 0.02 dB/km, an increment in attenuation at a wavelength of 1550 nm can be less than or equal to 0.004 dB/km.

In the optical fiber according to the present embodiment, preferably, the core is doped with fluorine. Since the core contains fluorine, the viscosity of the core is reduced, so that residual stress in the core can be easily allowed to be compressive stress. Thus, wavelength-independent attenuation can be reduced. Note that increasing fluorine content causes increase of Rayleigh scattering caused by concentration fluctuations. Preferably, therefore, fluorine is added at such a concentration that a reduction in relative refractive index due to addition of fluorine is greater than or equal to −0.1% and less than or equal to 0%.

The optical fiber according to the present embodiment may further include a primary coating and a secondary coating which surround the jacket. Preferably, the secondary coating has a Young's modulus greater than or equal to 800 MPa and the primary coating has a Young's modulus greater than or equal to 0.2 MPa and less than or equal to 1 MPa. Consequently, microbending loss can be reduced, thus preventing an increase in attenuation after cable formation.

In the optical fiber according to the present embodiment, at a wavelength of 1550 nm, a bending loss at a bend radius of 15 mm is preferably less than or equal to 0.002 dB/turn, a bending loss at a bend radius of 10 mm is preferably less than or equal to 0.2 dB/turn, a bending loss at a bend radius of 10 mm is preferably less than or equal to 0.1 dB/turn, and a bending loss at a bend radius of 7.5 mm is preferably less than or equal to 0.5 dB/turn. Furthermore, in the optical fiber according to the present embodiment, at a wavelength of 1625 nm, a bending loss at a bend radius of 15 mm is preferably less than or equal to 0.01 dB/turn, a bending loss at a bend radius of 10 mm is preferably less than or equal to 0.4 dB/turn, a bending loss at a bend radius of 10 mm is preferably less than or equal to 0.2 dB/turn, and a bending loss at a bend radius of 7.5 mm is preferably less than or equal to 1 dB/turn.

In the optical fiber according to the present embodiment, preferably, a MAC value that is the ratio (MFD/$\lambda c$) of the mode field diameter, MFD, at a wavelength of 1310 nm to the 2-m fiber cutoff wavelength, $\lambda c$, is less than or equal to 6.6. Such controls enable optical fibers having the above-described microbend loss to be obtained with high yield.

In the optical fiber according to the present embodiment, preferably, an attenuation difference ($\alpha\_\beta - \alpha\_t$) between an attenuation $\alpha\_\beta$ at a wavelength of 1550 nm measured on the fiber having a length of 10 km or longer wound on a 140-$\phi$ bobbin and an attenuation $\alpha\_t$ at a wavelength of 1550 nm measured on the fiber in a loosely constrained loop is less than 0.01 dB/km. Assuming that the optical fiber exhibits low attenuation in a coated state, the desired results may fail to be achieved if attenuation in actual use cannot be reduced. Reducing the attenuation difference ($\alpha\_\beta - \alpha\_t$) to be less than 0.01 dB/km can reduce attenuation in actual use.

In the optical fiber according to the present embodiment, preferably, the coated optical fiber has an outside diameter smaller than or equal to 210 µm and the secondary coating has a thickness greater than or equal to 10 µm. A need to pass many optical fibers through a limited duct, such as an existing duct, may arise. Such a need can be satisfied.

Preferred embodiments of an optical transmission system including the optical fiber according to the present invention as an optical transmission line are as follows.

An optical transmission system according to a first embodiment is an optical transmission system for transmission of signal light from an optical line terminal at a telephone central office through a splitter to an optical network unit at a subscriber's home. An optical transmission line between the optical line terminal at the telephone central office and the splitter has a length greater than or equal to 15 km. The optical fiber according to the present invention is placed in a section of 90% or more of the optical transmission line.

An optical transmission system according to a second embodiment is an optical transmission system for transmission of signal light from an optical line terminal at a telephone central office through a splitter to an optical network unit at a subscriber's home. An optical transmission line between the splitter and the optical network unit at the subscriber's home has a length greater than or equal to 15 km. The optical fiber according to the present invention is placed in a section of 90% or more of the optical transmission line.

An optical transmission system according to a third embodiment is an optical transmission system for transmission of signal light from a transmitter to a receiver. An optical transmission line between the transmitter and the receiver has a length greater than or equal to 40 km. The optical fiber according to the present invention is placed in a section of 90% or more of the optical transmission line.

An optical transmission system according to a fourth embodiment is an optical transmission system for transmission of signal light from an optical line terminal at a telephone central office through a splitter to an optical network unit at a subscriber's home. The optical fiber according to the present invention is placed in a section of 50% or more of an optical transmission line between the optical line terminal at the telephone central office and the optical network unit at the subscriber's home. The signal light is not amplified in the optical transmission line.

An optical transmission system according to a fifth embodiment is an optical transmission system for transmission of signal light from an optical line terminal at a telephone central office through a splitter to an optical network unit at a subscriber's home. The optical fiber according to the present invention is placed in a section of 50% or more of an optical transmission line between the optical line terminal at the telephone central office and the optical network unit at the subscriber's home. The signal light is amplified in the optical transmission line.

The use of the optical fiber according to the present invention as an optical transmission line in an optical transmission system enables improvement of the OSNR=10 log (Aeff×$\alpha$)−$\alpha$L as compared with a system using a related-art optical fiber. Herein, Aeff denotes the effective area at a signal light wavelength, $\alpha$ denotes attenuation at the signal light wavelength, and L denotes a transmission distance or length.

As the transmission length L increases, the amount of improvement in OSNR of the optical transmission system including the optical fiber according to the present invention increases. If the transmission length L is 15 km or longer, the OSNR of the optical transmission system including the optical fiber according to the present invention is improved by 0.1 dB or more as compared with a system including a general-purpose single-mode fiber compliant with ITU-T G. 652. A typical loss in connection with an optical fiber is at or below 0.1 dB. Accordingly, the use of the optical fiber according to the present invention can provide the OSNR improved by an amount corresponding to one or more connections. Furthermore, an OSNR margin against a connection failure or the like can be provided. In addition, since the transmission length can be increased, the rate of population coverage by one central office can be increased. Thus, the cost of construction of a transmission system in metro-access networks can be reduced.

A system in which the distance between an OLT and an ONU is in the range of approximately 10 km to approximately 25 km is a typical access system with no optical amplification. The use of the optical fiber according to the present invention in a section of at least 50% or more of an optical transmission line between the OLT and the ONU enables the distance of transmission with no optical amplification to be extended.

As an access system based on optical amplification, a system in which the distance between an OLT and an ONU is in the range of approximately 20 km to approximately 100 km is under study. The use of the optical fiber according to the present invention in a section of 50% or more of an optical transmission line between the OLT and the ONU enables the distance of transmission with optical amplification to be further extended. In addition, since an increase of noise during amplification can be suppressed and high OSNR can be achieved in such a distance, OSNR necessary for another device can be reduced. Thus, the system with high economic efficiency can be constructed.

INDUSTRIAL APPLICABILITY

The optical fiber according to the present invention can be used as an optical transmission line in an optical access network.

The invention claimed is:

1. A silica based glass optical fiber comprising:
a core including a center axis of the optical fiber;
an optical cladding surrounding the core; and
a jacket surrounding the optical cladding, wherein
the core contains $GeO_2$,
a refractive index volume $$v=2\int_0^a \Delta(r) \cdot r \cdot dr \quad (1)$$

of the core is greater than or equal to 0.045 $\mu m^2$ and less than or equal to 0.095 $\mu m^2$, where $\Delta(r)$ denotes the relative refractive index difference at a radial coordinate r and a denotes the radius of the core,
glass constituting the core has a fictive temperature higher than or equal to 1300° C. and lower than or equal to 1590° C., and
residual stress in the core is compressive stress that has an absolute value less than or equal to 30 MPa or tensile stress that has an absolute value less than or equal to 10 MPa.

2. The optical fiber according to claim 1, wherein
a relative refractive index difference $\Delta core$ of the core is greater than or equal to 0.35% and less than or equal to 0.50%, and
the jacket has a relative refractive index difference $\Delta J$ greater than or equal to 0.03% and less than or equal to 0.20%.

3. The optical fiber according to claim 1, wherein
a 22-m cable cutoff wavelength is less than or equal to 1260 nm, and
an attenuation at a wavelength of 1550 nm is less than or equal to 0.18 dB/km.

4. The optical fiber according to claim 3, wherein
a 2-m fiber cutoff wavelength is greater than or equal to 1260 nm, and
a mode field diameter at a wavelength of 1310 nm is greater than or equal to 8.2 $\mu m$.

5. The optical fiber according to claim 4, wherein
the mode field diameter at a wavelength of 1310 nm is less than or equal to 9 $\mu m$.

6. The optical fiber according to claim 1, wherein
the residual stress in part of 50% or more of the cross-sectional area of the jacket in a cross-section perpendicular to the axis of the fiber is tensile stress.

7. The optical fiber according to claim 1, wherein
an increment in attenuation due to OH groups at a wavelength of 1383 nm is less than or equal to 0.02 dB/km.

8. The optical fiber according to claim 1, wherein
the core is doped with fluorine.

9. The optical fiber according to claim 1, further comprising:
a primary coating and a secondary coating which surround the jacket, wherein
the secondary coating has a Young's modulus greater than or equal to 800 MPa, and
the primary coating has a Young's modulus less than or equal to 1 MPa.

10. The optical fiber according to claim 9, wherein
the primary coating has a Young's modulus greater than or equal to 0.2 MPa.

11. The optical fiber according to claim 1, wherein
a bending loss at a bend radius of 15 mm and at a wavelength of 1550 nm is less than or equal to 0.002 dB/turn.

12. The optical fiber according to claim 1, wherein
a bending loss at a bend radius of 10 mm and at a wavelength of 1550 nm is less than or equal to 0.2 dB/turn.

13. The optical fiber according to claim 1, wherein
a bending loss at a bend radius of 7.5 mm and at a wavelength of 1550 nm is less than or equal to 0.5 dB/turn.

14. The optical fiber according to claim 1, wherein
a bending loss at a bend radius of 15 mm and at a wavelength of 1625 nm is less than or equal to 0.01 dB/turn.

15. The optical fiber according to claim 1, wherein
a bending loss at a bend radius of 10 mm and at a wavelength of 1625 nm is less than or equal to 0.4 dB/turn.

16. The optical fiber according to claim 1, wherein
a bending loss at a bend radius of 7.5 mm and at a wavelength of 1625 nm is less than or equal to 1 dB/turn.

17. The optical fiber according to claim 1, wherein
a MAC value (=MFD/$\lambda c$) that is the ratio of a mode field diameter MFD at a wavelength of 1310 nm to a 2-m fiber cutoff wavelength $\lambda c$ is less than or equal to 6.6.

18. The optical fiber according to claim 1, wherein
an attenuation difference ($\alpha\_\beta - \alpha\_t$) between an attenuation $\alpha\_\beta$ at a wavelength of 1550 nm measured on the fiber having a length of 10 km or longer wound on a 140-$\phi$ bobbin and an attenuation $\alpha\_t$ at a wavelength of 1550 nm measured on the fiber in a loosely constrained loop is less than 0.01 dB/km.

19. The optical fiber according to claim 1, wherein
the optical fiber with coating has an outside diameter less than or equal to 210 $\mu m$ and a secondary coating has a thickness greater than or equal to 10 $\mu m$.

* * * * *